(12) United States Patent
Mullaney, III

(10) Patent No.: US 6,322,079 B1
(45) Date of Patent: Nov. 27, 2001

(54) FACE SEAL

(75) Inventor: John J. Mullaney, III, Conventry, RI (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 09/420,856

(22) Filed: Oct. 19, 1999

(51) Int. Cl.[7] ................................................. F16J 15/54
(52) U.S. Cl. ............................ 277/371; 277/384; 277/586
(58) Field of Search .................................. 277/371, 375, 277/382, 385, 379, 384, 586, 910, 914

(56) References Cited

U.S. PATENT DOCUMENTS 3,161,414 * 12/1964 Porges ............................. 277/385 X
3,784,213 *  1/1974 Voitik ............................. 277/384 X
5,571,268 * 11/1996 Azibert ............................. 277/382

* cited by examiner

Primary Examiner—Robert J. Sandy
Assistant Examiner—Karlena D. Schwing
(74) Attorney, Agent, or Firm—Iandiorio & Teska

(57) ABSTRACT

A seal cartridge for a face seal comprising an annular housing having an inner and outer wall and a back wall; a seal ring composite in said housing; a first resilient member disposed between said housing and said seal ring composite for providing an axial bias on said seal ring composite, said seal ring composite including a support shell and a sealing insert supported in said shell for providing a primary seal with a rotor; a second resilient member disposed between said seal ring composite and one of said inner and outer walls for providing a secondary seal; a rotor in said housing, said rotor having a sealing ring groove between said rotor and a shaft to be engaged, said groove having an inner end and an outer end; and a sealing ring disposed in said groove, said groove having a width at its inner end approximately equal to or less than the width of said sealing ring and a width at its outer end confronting the shaft greater than the width of said sealing ring for sealing the rotor to the shaft and inhibiting axial movement of said rotor along the shaft.

19 Claims, 4 Drawing Sheets

FIG. 1
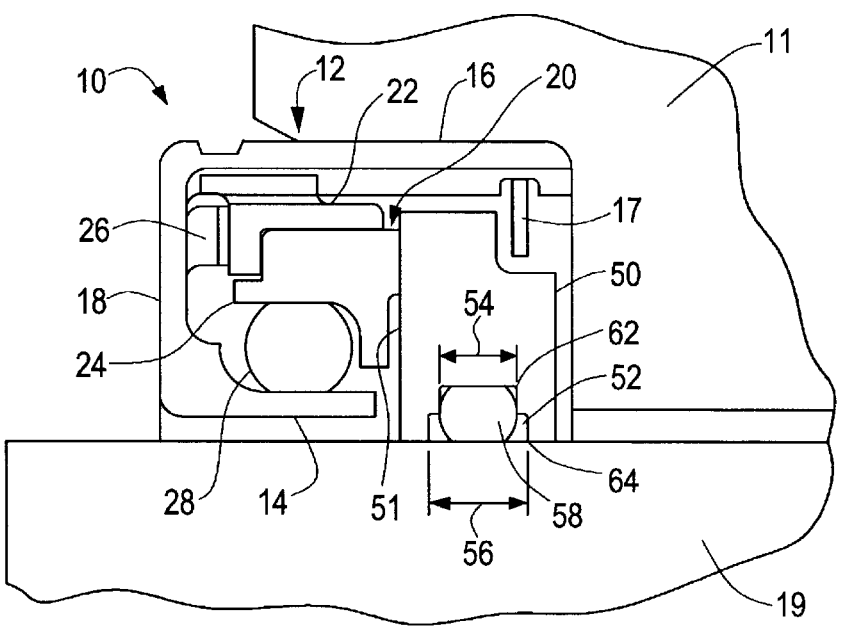
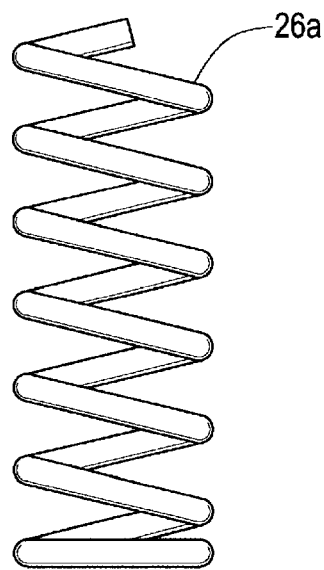
FIG. 1A
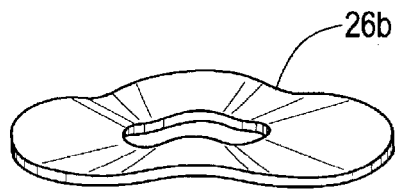
FIG. 1B

FACE SEAL

FIELD OF INVENTION

This invention relates to an improved face seal and more particularly to such an improved face seal which can be combined with a rotor assembly to form a cartridge and to an assembly tool useful therewith.

BACKGROUND OF INVENTION

A common use of seals is to prevent fluids from leaking around shafts in aircraft gearboxes, aircraft accessories, pumps, motors, turbines, spindles, and other rotating equipment. Typically, mechanical face seals or lip seals are used to seal such shafts, but there are distinct disadvantages to both types of seals. Mechanical face seals operate at higher speeds and pressures and seal life is far superior to that of existing lip seals. However, mechanical face seals are normally three times axially longer than a lip seal for the same application and are thus unsuitable for use. The ideal seal would have the axial length of a lip seal with the performance of a mechanical face seal. Attempts at shortening existing mechanical face seals have not been successful due to seal face distortion as seal axial length is reduced. Distortion of the seal face causes seal leakage to increase excessively and thus the seal cannot be used.

Additionally, rotors on existing mechanical face seals normally are positioned against a step in the shaft or the end of a bearing to prevent axial movement of the rotor relative to the shaft. Existing rotors normally also have engagement into the shaft to ensure that the rotor rotates with the shaft. If a mechanical face seal is to be used to replace an existing lip seal, the rotor must be capable of being positioned on a shaft without a step and be capable of being rotated with the shaft without relative axial or radial movement. The rotor must also prevent leakage between the rotor and the shaft.

BRIEF SUMMARY OF THE INVENTION

It is therefore an object of this invention to provide an improved seal assembly for a face seal.

It is a further object of this invention to provide such a seal assembly for a face seal which can operate at a reduced axial length and weight.

It is a further object of this invention to provide such a seal assembly for a face seal which can be used in the same space as a lip or magnetic seal.

It is a further object of this invention to provide such a seal assembly for a face seal with an improved seal between the sealing composite and a rotor.

It is a further object of this invention to provide such a seal assembly which positions a rotor on a shaft without a step.

It is a further object of this invention to provide such a seal assembly for a face seal which inhibits radial and axial movement of a rotor along a high velocity rotating shaft.

It is a further object of this invention to provide such a seal assembly for a face seal that the seal assembly, rotor and rotor drive ring can be assembled together as a cartridge.

It is a further object of this invention to provide such a seal assembly for a face seal that the seal assembly, rotor, and rotor drive ring can be configured separately.

It is a further object of this invention to provide an assembly tool for installing such a cartridge.

The invention results from the realization that a truly effective, smaller face seal can be achieved by using a support shell to support a primary seal insert and folding the housing so that the secondary seal is disposed proximate the seal insert resulting in an axially shorter length and the further realization that an improved rotor can be made which is both sealed to and inhibited from moving along a shaft to be sealed by providing a sealing ring groove which has a first section which is equal to or smaller than the sealing ring to hold and compress it and a second section which is larger than the sealing ring to allow it to maximize sealing ring compression to ensure maximum holding power of the sealing ring.

This invention features a seal cartridge for a face seal including an annular housing having an inner and outer wall and a back wall and a seal ring composite in the housing. A first resilient member is disposed between the housing and the seal ring composite for providing an axial bias on the seal ring composite. The seal ring composite includes a support shell and a sealing insert supported in the shell for providing a primary seal with a rotor. A second resilient member is disposed between the seal ring composite and one of the inner and outer walls for providing a secondary seal. The rotor is located in the housing, the rotor having a sealing ring groove between the rotor and a shaft to be engaged. The groove has an inner end and an outer end. A sealing ring is disposed in the groove, the groove having a width at its inner end approximately equal to or less than the width of the sealing ring and a width at its outer end confronting the shaft greater than the width of the sealing ring for sealing the rotor to the shaft and inhibiting axial movement of the rotor along the shaft.

In a preferred embodiment, the first resilient member may be a spring. Further, the first resilient member may be a wave washer. The first resilient member may be disposed between the back wall of the housing and the seal ring composite, and more specifically, between the back wall of the housing and the support shell. The second resilient member may be disposed between the inner wall of said housing and the seal ring composite, and more specifically, between the inner wall of the housing and the sealing insert. The second resilient member may be an "O" ring. The sealing insert may be made of carbon. The housing and the seal ring composite may be engaged to prevent rotation of the seal ring composite. The sealing ring groove may include at least two stepped sections. The sealing ring groove may have tapered side walls. The sealing ring may be an "O" ring. The seal cartridge may further include an assembly tool having a bearing surface for engaging the seal cartridge. The assembly tool may have a first bearing surface for engaging the rotor and a second bearing surface spaced from the first bearing surface for engaging the housing and preloading the first resilient member, maintaining engagement of the sealing insert with the rotor and setting the axial extent of the seal cartridge.

Another embodiment of this invention features a face seal cartridge assembly kit comprising an annular housing and a seal ring composite in the housing. A first resilient member is disposed between the housing and the seal ring composite for providing an axial bias on the seal ring composite. A second resilient member is disposed between the seal ring composite and the housing for providing a secondary seal. The rotor is located in the housing, the rotor having a sealing ring groove between the rotor and a shaft to be engaged. A sealing ring is disposed in the sealing ring groove. Also included is an assembly tool having a first bearing surface for engaging the rotor and a second bearing surface spaced from the first bearing surface for engaging the housing and preloading the first resilient member, maintaining engagement of the sealing insert with the rotor and setting the axial extent of the seal cartridge.

Another embodiment of this invention features a seal assembly for a face seal including an annular housing having an inner and outer wall and a back wall and a seal ring composite in the housing. A first resilient member is disposed between the housing and the seal ring composite for providing an axial bias on the seal ring composite. The seal ring composite includes a support shell and a sealing insert supported in the shell for providing a primary seal with a rotor. A second resilient member is disposed between the seal ring composite and one of the inner and outer walls for providing a secondary seal.

In a preferred embodiment, the first resilient member may be a spring. Further, the first resilient member may be a wave washer. The first resilient member may be disposed between the back wall of the housing and the seal ring composite, and more specifically, between the back wall of the housing and the support shell. The second resilient member may be disposed between the inner wall of said housing and the seal ring composite, and more specifically, between the inner wall of the housing and the sealing insert. The second resilient member may be an "O" ring. The sealing insert may be made of carbon. The housing and the seal ring composite may be engaged to prevent rotation of the seal ring composite. The sealing ring groove may include at least two stepped sections. The sealing ring groove may have tapered side walls. The sealing ring may be an "O" ring.

BRIEF DESCRIPTION OF THE DRAWINGS

Other objects, features and advantages will occur to those skilled in the art from the following description of a preferred embodiment and the accompanying drawings, in which:

FIG. 1 is a cross sectional view along line AA of FIG. 2 showing of an improved face seal cartridge according to the present invention;

FIGS. 1A and 1B are perspective views of different embodiments of the first resilient member according to the present invention;

PREFERRED EMBODIMENT

Figure 2:
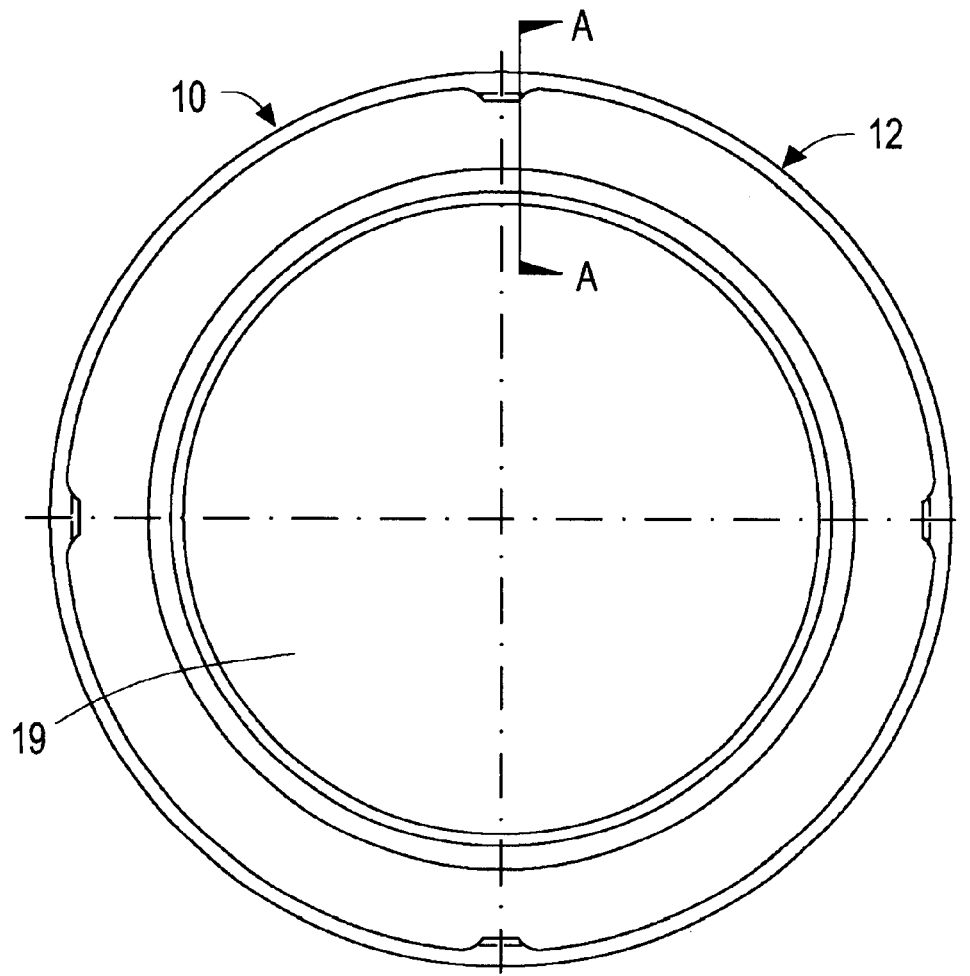
FIG. 2 is a front view of the improved face seal cartridge of FIG. 1 mounted on a shaft.

There is shown in FIGS. 1 and 2 an improved face seal cartridge 10, according to this invention, including an annular housing 12, the annular housing having an inner side wall 14, an outer side wall 16 and a back wall 18. Annular housing 12 may be made from any suitable material, preferably a metallic material. Annular housing 12 is sized to be fitted about a cylindrical shaft 19 and pressed or slip fit into a motor housing cover 11. A seal ring composite 20 is located within annular housing 12. Seal ring composite 20 is comprised of support shell 22 and sealing insert 24. Seal ring composite 20, and more particularly support shell 22, is in engagement with housing 12 to prevent rotation of seal ring composite 20. Support shell 22 and sealing insert 24 are shaped so that the top surface of sealing insert 24 is cradled by the bottom surface of support shell 22 as shown. Support shell 22 can be made from any suitable material, preferably a metallic material such as 304L stainless steel. In a preferred embodiment, sealing insert 24 is made of carbon, although bronze would also be sufficient.

A first resilient member 26 is disposed between housing 12 and seal ring composite 20. As shown, first resilient member 26 may be disposed between back wall 18 of annular housing 12 and seal ring composite 20, and more particularly, support shell 22. First resilient member 26 provides an axial bias on seal ring composite 20, and more particularly on support shell 22, which creates a primary seal between seal ring composite 20 and rotor 50. The primary seal may be formed between sealing insert 24 and rotor 50. First resilient member 26 may be a spring 26a, FIG. 1A and more particularly may be a wave washer 26b, FIG. 1B. As sealing insert 24 is pressed into and supported by support shell 22, sealing insert 24 remains flat when subjected to the axial bias of first resilient member 26. Support shell 22 minimizes temperature variations axially and minimizes deflections due to torsion reactions with housing 12, keeping sealing insert 24 flat when subjected to temperature and speed.

A second resilient member 28 is disposed between one of side walls 14 and 16 of housing 12 and seal ring composite 20. Second resilient member 28 provides a secondary seal between seal ring composite 20 and housing 12. Second resilient member 28 may be disposed between inner wall 14 of housing 12 and seal ring composite 20, and more particularly seal sealing insert 24. In this embodiment, second resilient member 28 is an "O" ring, although rings of other shapes would also suffice. Outerside wall 16 forms a seal with motor housing cover 11 by being press fit against motor housing cover 11. Additionally, an "O" ring may be located in the motor housing cover 11 to increase the seal between the motor housing cover 11 and housing 12.

Rotor 50 is also disposed in annular housing 12. Outer side wall 16 is greater in length than inner side wall 14 to accommodate rotor 50. Outer side wall 16 also includes a retainer 17, which prevents rotor 50 from separating from the face seal during assembly of face seal cartridge 10.

Figure 3:
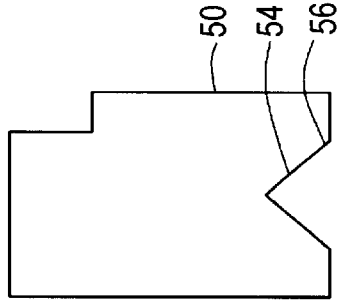
FIG. 3 is a sectional view of the rotor of FIG. 1 showing a different embodiment of the sealing ring groove.
Figure 4:
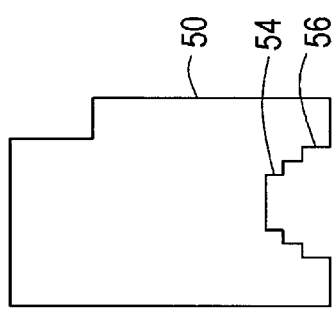
FIG. 4 is a sectional view of the rotor of FIG. 1 showing a different embodiment of the sealing ring groove.

Rotor 50 includes a sealing ring groove 52, which is another feature of the invention. Sealing ring groove 52 has an inner end 54 and an outer end 56 at the bottom end of the rotor. A sealing ring 58 is disposed in sealing ring groove 52, which is another feature of the invention. Sealing ring 58 may be an "O" ring. Sealing ring groove 52 has an inner end width 54 approximately equal to or less than the width of sealing ring 58 and an outer end width 56 greater than the width of sealing ring 58 for sealing the rotor 50 to the shaft and for preventing movement of rotor 50 along the shaft. The smaller width of sealing ring groove 52 at its inner end 54 serves to hold and compress the sealing ring 58 and the larger width of the sealing ring groove 52 at its outer end 56 allows sealing ring 58 room to deform when compressed. Sealing ring groove 52 is designed to maximize the compression of sealing ring 58 and also to ensure that the volume of sealing ring 58 is less than the volume of sealing ring groove 52 at maximum material condition. This ensures a tight seal between sealing ring groove 52 and sealing ring 58 and ensures maximum holding power of sealing ring 58. Sealing ring groove 52 may include two stepped sections 62 and 64, FIG. 1. However, sealing ring groove 52 may include more than two stepped sections, FIG. 3, or tapered side walls 60, FIG. 4.

The seal formed between sealing ring groove 52 and sealing ring 58 inhibits radial and axial movement of rotor 50 along shaft 19. This eliminates the need for any additional anti-rotation features in rotor 50. The seal also eliminates the need for a shaft shoulder or engagement into the shaft to properly position, drive and seal rotor 50. The axial length of rotor 50 is thus reduced because engagement of rotor 50 into shaft 19 is not required and because the axial length of sealing ring groove 52 is minimized. As mechanical engagement of rotor 50 to shaft 19 has been eliminated and because torque is transmitted through sealing ring 58, torsion and thermal deflections are minimized, which keeps rotor face 51 flat. Reducing the axial length of seal 10 and keeping sealing insert 24 and rotor face 51 flat results in less seal leakage and an improved seal over existing seals.

Face seal cartridge 10 is designed to replace certain types of existing seals, including lip seals and magnetic seals. Face seal cartridge 10 can fit in approximately the same axial and radial length as existing lip and magnetic seals as the arrangement of seal components dramatically reduces the axial length of the face seal.

To load the face seal cartridge described above onto a shaft, an assembly tool 70, FIG. 5, is advantageous. Assembly tool 70 includes a handle 72, a first bearing surface 74 on a first finger 76 for engaging rotor 50 and a second bearing surface 78 on a second finger 80 for engaging housing 12. Assembly tool 70 is designated to set the desired axial location of rotor 50 on shaft 19. The difference in length between second finger 80 and first finger 76 determines the axial extent of the face seal.

Before installing face seal cartridge 10 on shaft 19, first resilient member 26 pushes seal ring composite 20 and rotor 50 axially forward until rotor 50 contacts retainer 17. The natural tendency of rotor 50 is to move away from sealing insert 24. Retainer 17 prevents rotor 50 from separating from face seal 10 during installation of face seal cartridge 10. To assemble face seal cartridge 10 on shaft 19, assembly tool 70 is positioned on face seal cartridge 10 such that second bearing surface 78 of assembly tool 70 contacts back wall 18 of annular housing 12. When positioned in such a manner, first bearing surface 74 does not yet contact rotor 50. As sealing ring 50 engages shaft 19, sealing ring 58 compresses in sealing ring groove 52. Sealing ring 58 also prevents rotor 50 from moving axially until first bearing surface 74 contacts rotor 50. When both bearing surfaces 74 and 78 are engaged, assembly tool 70 maintains engagement of sealing insert 24 with rotor 50. Once first bearing surface 74 contacts rotor 50, rotor 50 moves axially with the remainder of face seal cartridge 10. Assembly tool 70 is used to axially move face seal cartridge 10 until face seal cartridge 10 is properly positioned in motor housing cover 11. The length of first finger 76 of assembly tool 70 is designed to properly position rotor 50 such that rotor 50 does not contact retainer 17. Upon completion, assembly tool 70 is removed from engagement with the face seal cartridge and withdrawn.

Once face seal cartridge 10 has been loaded onto a shaft, the unique design of sealing ring groove 52 of rotor 50 forms a tight seal about shaft 19 which serves to inhibit radial and axial movement of rotor 50 along shaft 19. First resilient member 26 provides an axial bias on support shell 22, which in turn provides an axial bias on sealing insert 24. This axial bias forces sealing insert 24 to contact with rotor 50, thereby creating a seal between sealing insert 24 and rotor 50. Second resilient member 28 also provides a bias to sealing insert 24 which creates a secondary seal between sealing insert 24 and rotor 50. A seal also exists between housing 12 and motor housing cover 11. The combination of the seals serves to prevent leakage across the seal.

The arrangement of seal components as shown above reduces the seal axial length without sacrificing the seal face flatness. The reduced length of the seal ring composite decreases thermal gradients and tortional distortions are minimized. This results in less seal face distortion and therefore reduced leakage.

Figure 5:
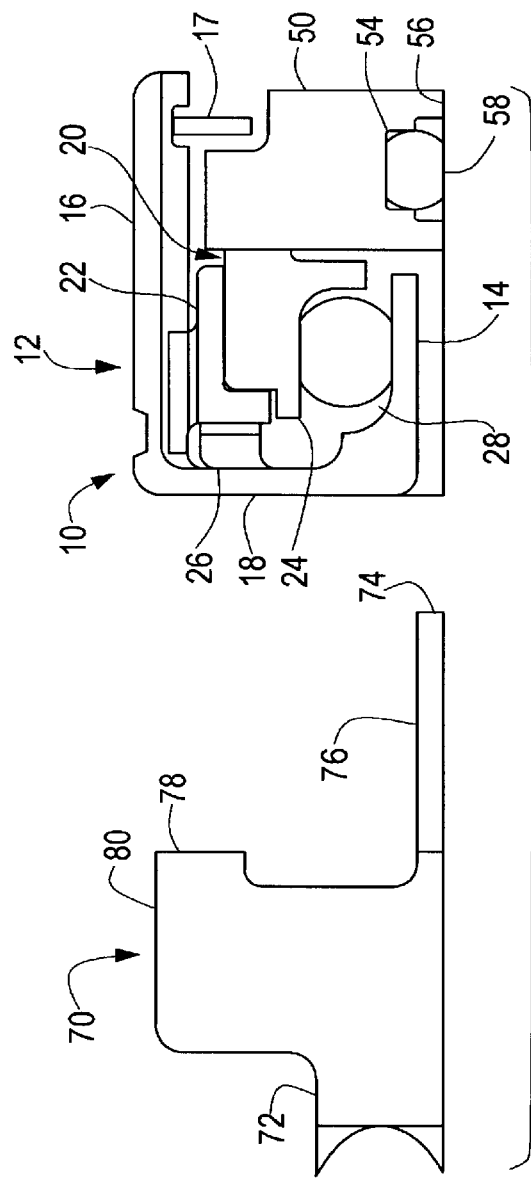
FIG. 5 is an exploded view of the seal cartridge of FIG. 1 and an assembly tool used to install the seal cartridge.
Figure 6:
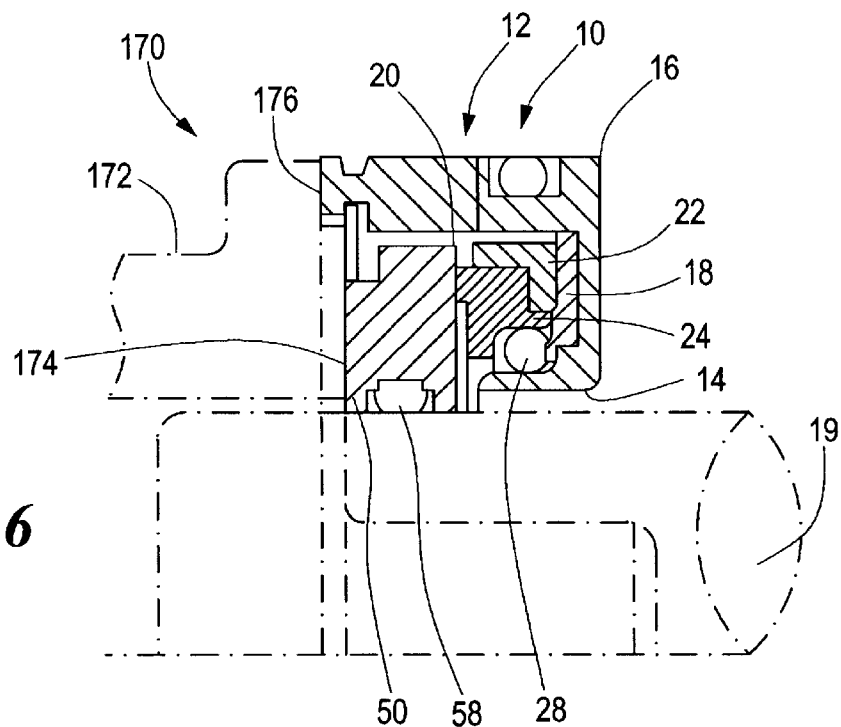
FIG. 6 is a sectional view of the seal cartridge of FIG. 1 installed on a shaft and a different embodiment of the assembly tool used to install the seal cartridge.

In some applications, it may be necessary to install the face seal cartridge in a manner opposite that shown in FIG. 5. In such an application, the face seal cartridge is installed with the housing preceding the rotor, FIG. 6. To load the face seal cartridge on a shaft in such a manner, assembly tool 170 is advantageous. Assembly tool 170 includes a handle 172, first bearing surface 174 for engaging rotor 50 and a second bearing surface 176 for engaging housing 12. A user grasps assembly tool 170 by handle 172 and engages the bearing surface 174 and 176 with face seal cartridge 10. Face seal cartridge 10 is slid over the target shaft, and assembly tool 170 is withdrawn upon completion.

Figure 7:
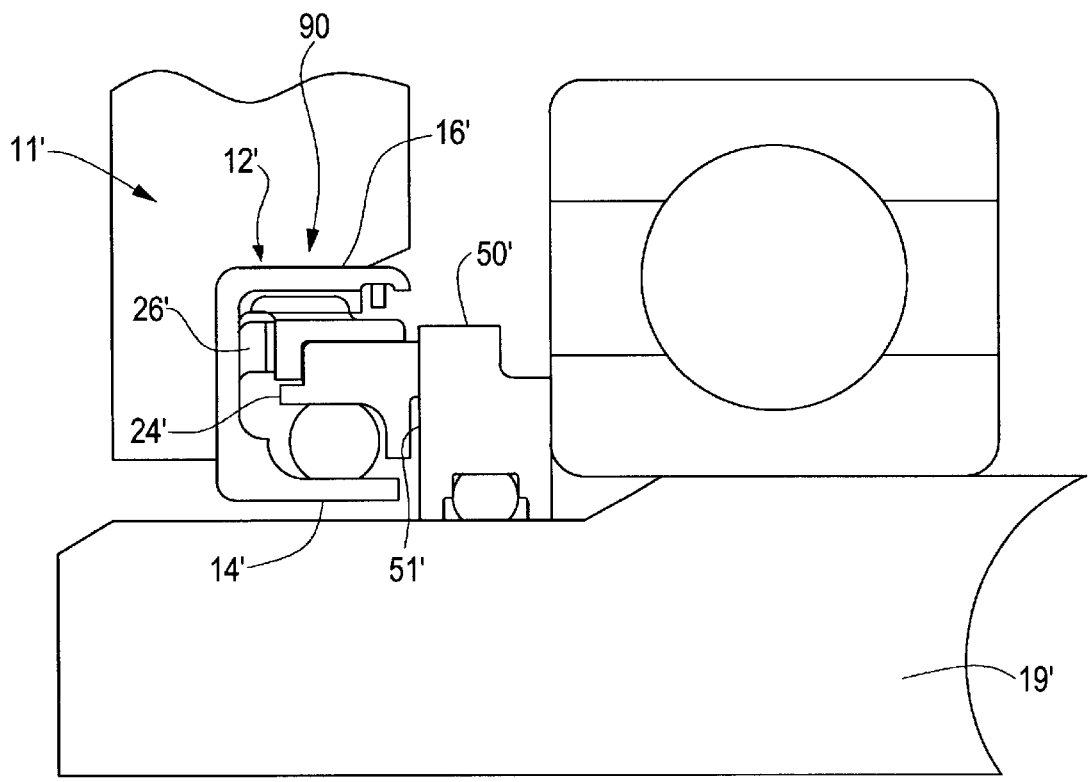
FIG. 7 is a cross sectional view symmetrical about the center line of a shaft of a seal assembly and rotor assembly according to the present invention.

In applications where the rotor is already installed about a shaft or where the shaft has a step or bearing to position the rotor, it is unnecessary to install a face seal cartridge. In these applications a seal assembly can be installed without the use of assembly tool 70. Such a seal assembly 90 is shown in FIG. 7. As seal assembly 90 is almost identical to the face seal cartridge described above, those parts in common between the seal assembly 90 and the face seal cartridge will be indicated by using the same reference numbers followed by a "'". As there is no rotor contained within the housing 12', the outer side wall 16' does not need to be greater in length that the inner side wall 14'. Otherwise, the seal assembly 90 is identical to the face seal cartridge described above.

In operation, seal assembly 90 is installed in motor housing cover 11' in the same manner as existing face seals. Rotor 50' is installed on the shaft by pushing rotor 50' by hand until it bottoms against the bearing or shaft shoulder. Housing cover 11' with seal assembly 90 is then installed into the motor housing to complete installation of the seal assembly.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A seal cartridge for a face seal comprising:

an annular housing having an inner and outer wall and a back wall;

a seal ring composite in said housing;

a first resilient member disposed between said housing and said seal ring composite for providing an axial bias on said seal ring composite, said seal ring composite including a support shell and a sealing insert supported in said shell for providing a primary seal with a rotor;

a second resilient member disposed between said seal ring composite and one of said inner and outer walls for providing a secondary seal;

a rotor in said housing, said rotor having a sealing ring groove between said rotor and a shaft to be engaged, said groove having an inner end and an outer end; and a sealing ring disposed in said groove, said groove having a width at said inner end approximately equal or less than the width of said sealing ring and a width at said outer end confronting the shaft greater than the width of said sealing ring for sealing the rotor to the shaft and inhibiting axial movement of said rotor along the shaft.

2. The seal cartridge of claim 1 in which said first resilient member is a spring.

3. The seal cartridge of claim 1 in which said first resilient member is a wave washer.

4. The seal cartridge of claim 1 in which said first resilient member is disposed between said back wall of said housing and said seal ring composite.

5. The seal cartridge of claim 1 in which said first resilient member is disposed between said back wall of said housing and said support shell.

6. The seal cartridge of claim 1 in which said second resilient member is disposed between said inner wall of said housing and said seal ring composite.

7. The seal cartridge of claim 1 in which said second resilient member is disposed between said inner wall of said housing and said sealing insert.

8. The seal cartridge of claim 1 in which said second resilient member is an "O" ring.

9. The seal cartridge of claim 1 in which said sealing insert is made of carbon.

10. The seal cartridge of claim 1 in which said housing and said seal ring composite are engaged to prevent rotation of said seal ring composite.

11. The seal cartridge of claim 1 in which said groove includes at least two stepped sections.

12. The seal cartridge of claim 1 in which said groove has tapered side walls.

13. The seal cartridge of claim 1 in which said sealing ring is an "O" ring.

14. The seal cartridge of claim 1 in which said seal cartridge further includes an assembly tool having at least one bearing surface for engaging said seal cartridge.

15. The seal cartridge of claim 1 in which said seal cartridge further includes an assembly tool having a first bearing surface for engaging said rotor and a second bearing surface spaced from said first bearing surface for engaging said housing and preloading said first resilient member, maintaining engagement of said sealing insert with said rotor and setting the axial extent of said seal cartridge.

16. A rotor assembly for a face seal comprising:

a rotor having a sealing ring groove between said rotor and a shaft to be engaged, said groove having an inner end and an outer end; and a sealing ring disposed in said groove, said groove having a width at said inner end approximately equal to or less than the width of said sealing ring and a width at said outer end confronting the shaft greater than the width of said sealing ring for sealing the rotor to the shaft and inhibiting axial movement of said rotor along the shaft.

17. The rotor assembly of claim 16 in which said groove includes at least two stepped sections.

18. The rotor assembly of claim 16 in which said groove has tapered side walls.

19. The rotor assembly of claim 16 in which said sealing ring is an "O" ring.

* * * * *